Patented Feb. 24, 1948

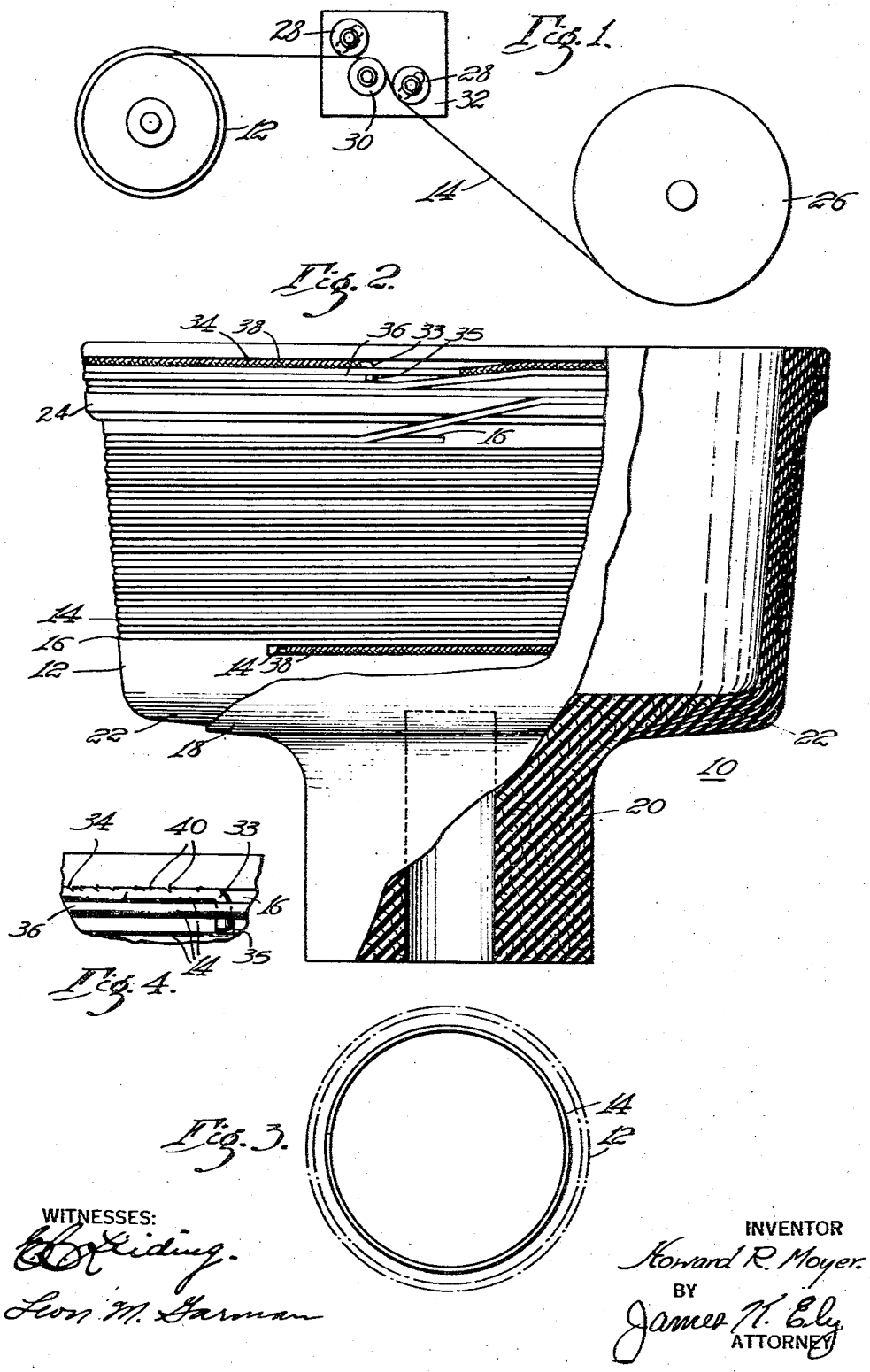

2,436,726

UNITED STATES PATENT OFFICE 2,436,726

CENTRIFUGE BUCKET

Howard R. Moyer, Wilkinsburg, Pa., assignor to Westinghouse Electric Corporation, East Pittsburgh, Pa., a corporation of Pennsylvania Application August 10, 1945, Serial No. 610,129

17 Claims. (Cl. 57—76)

This invention relates to centrifuge buckets of the type utilized in the spinning of rayon.

In the manufacture of centrifuge buckets, it has been customary to wrap wire under tension about the preform of the bucket and to so anchor the wire as to maintain the wire under tension for applying compressive forces to the bucket whereby the bucket is capable of withstanding the centrifugal forces developed when the bucket is in use. A layer of fibrous material impregnated with resin is customarily so applied to the side walls of the bucket as to cover the reinforcing member after which the components are consolidated under heat and pressure.

Heretofore, it has been quite difficult to satisfactorily anchor the ends of the wire reinforcement to maintain the wire under tension and prevent the resilient forces of the wire from being exerted against the outside cover of the bucket. In practice a method which has been commonly used is to wind the wire around the bucket preform with sufficient tension to maintain the wire in a tight fit with the preform without appreciable stress in the wire. The ends of the wire are then soldered to the adjacent turn, it being noted that because of the resiliency of the wire the soldered joint has to be sufficiently strong to hold the ends securely as otherwise the wire would spring away or uncoil from the preform. In making the solder joint an acid flux is utilized and unless the last trace of the acid is removed from the soldered joint, it is found that blisters form at the joint in the bucket as finally consolidated. The soldered joints often break during the forming of the bucket with the result that the wire reinforcement uncoils from the preform. In some cases, it has been found that the consolidated bucket is damaged where the soldered joint is broken during the consolidation of the components as the resilient force of the wire is then exerted against the thin outside cover layer of the bucket.

An object of this invention is to provide a centrifuge bucket with a reinforcing member having a preset applied to engage a component of the bucket with a biasing force.

Another object of this invention is to provide a centrifuge bucket with a self-biasing reinforcing member.

A further object of this invention is to provide a centrifuge bucket having a self-biasing reinforcing member in the side walls thereof for rendering the bucket capable of withstanding the centrifugal forces developed in operation.

Other objects of this invention will become apparent from the following description when taken in conjunction with the accompanying drawing, in which:

Figure 1 is a schematic showing of apparatus utilized in producing the article of this invention, Fig. 2 is a view in elevation partly in section and with parts removed of a bucket embodying the teachings of this invention, Fig. 3 is a plan view representative of the relative size of an unrestrained reinforcing member with respect to a part of the centrifuge bucket as utilized in practicing the teachings of this invention, and Fig. 4 is a fragmentary view, somewhat enlarged, of a part of the bucket of Fig. 2 illustrating a detail of assembly.

Referring to Fig. 2 of the drawings, there is generally shown a centrifuge bucket 10 formed of a plurality of cooperating components. The bucket 10 illustrated comprises a side wall base member 12, a reinforcing member 14 disposed in grooves 16 formed on the outer surface of the side wall base member, an outer side wall cover member 18 and a bottom or base 20, the assembly being consolidated under heat and pressure into an integral unit.

The side wall base member 12 and the outer side wall cover member 18 are preferably formed of laminated fibrous material such as duck or other suitable cloth impregnated with a resinous binder of the phenolic type, whereas the base 20 is preferably formed from chopped or macerated duck or other fibrous material impregnated with a phenolic type of resinous binder.

In practice, the side wall base member 12 is preferably formed by winding a required number of laminations (not shown) of impregnated cloth about a mandrel, after which the layers are subjected to sufficient heat and pressure to partially cure the resinous binder and impart a predetermined shape thereto. The preform of the molded base member thus resulting somewhat resembles a tapered cylinder having its smaller end partially closed as indicated at 22 with a tapered or feathered edge. When desired the outer surface may be molded to shape with a rim 24 formed adjacent the larger end or the outer surface of the preform or cylinder may be machined to shape to provide the upper rim portion 24. In either case the grooves 16 are cut into the outer surface of the preform in a predetermined manner.

The reinforcing member 14 is preferably stainless steel wire having a diameter of between .062"

and .072" and minimum tensile strength of 200,000 pounds per square inch. The wire 14 is given a predetermined preset in a manner illustrated in Fig. 1 prior to being applied to the side wall base member 12. As shown, the wire 14 is drawn from a reel 26 as the wire is fed between a plurality of offset pulleys 28 and 30, the pulleys 28 being indicated as being adjustably mounted on a base member 32. The pulleys 28 are adjustably mounted in order to vary the preset imparted to the wire 14, such preset being determined by the outer diameter of the side wall base member 12 to which the wire 14 is to be applied. In all cases, the preset imparted to the wire 14 is so great that the wire 14 having the preset applied thereto has a smaller diameter in an unrestrained position, as illustrated in Fig. 3, than the smallest outer diameter of the side wall base member 12.

In practice the wire 14 is applied directly to the side wall base member after having been drawn from between the offset pulleys 28 and 30, as illustrated in Fig. 1. As more clearly shown in Fig. 2, the first convolution 34 of the wire 14 is laid in the groove in the machined rim 24 and the side wall base member 12 is then turned by any suitable means (not shown) to effect the continuous positioning of the wire 14 in the continuous grooves 16 about the member 12. In order to facilitate the winding of the wire on the side wall base member, the end 33 of the wire 34 may be bent to fit in a short groove 35 which is at substantially right angles to the grooves 16 and the second convolution 36 of the wire may overlap the bent end 33 of the first convolution, as illustrated, to aid in holding the end of the wire 14 to resist the pull of winding, the tension applied during the winding being sufficient to cause the wire 14 to snugly fit in the grooves 16 on the preformed side wall base member. When sufficient turns of the wire 14 have been applied, the wire is cut and the end of the last turn lies in the groove 16, the wire being retained in position by the self-biasing action of the wire 14 caused by the preset imparted thereto prior to applying the wire 14 to the member 12.

Upon examination, it is found that the biasing action of the wire 14 having the preset is sufficient to maintain the wire 14 on the side wall base member while tending to apply a compressive force thereto. Where desired, the ends of the wire 14 may be covered with a short length of fibrous sleeving 38, as illustrated in Fig. 2, or the ends of the wire can be roughened as by scoring or knurling or nicking as indicated at 40 in Fig. 4 to aid in bonding or consolidating the components of the bucket.

In consolidating the components of the centrifuge bucket the side wall base member 12 carrying the wire 14 thus applied is placed upon a suitable mold (not shown) after which the outer side wall cover member 18 is positioned thereabout and a suitable quantity of the chopped or macerated impregnated fibrous material is applied for forming the base 20. It is to be noted that the member 18 preferably comprises a number of laminations so that in the final molded article the wire 14 is preferably positioned throughout at least the major part of the side wall approximately near the center of the thickness of the side wall of the resulting bucket 10. The member 18 thus applied not only constitutes a cover member but also forms a large part of the resulting side wall of the bucket 10. When thus assembled and subjected to heat at a temperature between 170° C. and 180° C. and pressure of the order of 3000 pounds per square inch, the components of the assembly are molded into an integral unit.

During the molding operation the partially cured side wall member 12 is forced onto a mold (not shown) which is slightly larger than the internal diameter of the side wall base member 12 as originally preformed on the mandrel and as a result, the member 12 is slightly enlarged or expanded during the molding. As this occurs, it is found that the wire 14 having the preset imparted thereto while being capable of slight movement about the periphery of the member 12 tends to engage the side wall base member 12 with more of a biasing action to hold the member 12 under compression. As the components of the bucket 10 are consolidated, the resin of the laminations flows about the wire 14 whereby the wire is firmly held in position intermediate of the inner and outer surfaces of the side wall of the molded bucket 10, the outer side wall cover member 18, side wall base member 12 and the base 20 being consolidated into an integral unit.

Where the short sleeves 38 of fibrous material are utilized to cover the ends of the wire, the resin bonds with the sleeving to aid in maintaining the wire as positioned against the radial pull which will be encountered in service because of the centrifugal force developed. Similarly, if the ends of the wire are roughened as by scoring, knurling or nicking, the resin of the laminations will cooperate therewith to aid in maintaining the wire in the initial assembled position, as well as providing anchorage against tangential pull developed in the wire in service.

In service it is found that the centrifugal forces developed tend to exert a tensile stress in the wire, but that such centrifugal forces are successfully withstood. By providing for banding the bucket without the necessity of utilizing soldered joints, a possible dangerous condition is eliminated and large economies are effected.

I claim as my invention:

1. In a centrifuge bucket comprising, in combination, a side wall base member of fibrous material impregnated with resinoid, the side wall base member being adapted to receive a reinforcing member circumferentially about its outer surface, the reinforcing member being given a preset to have a diameter when unrestrained smaller than the outer diameter of the side wall base member whereby when applied to the side wall base member the reinforcing member engages the side wall base member with a biasing action.

2. In a centrifuge bucket comprising, in combination, a side wall base member of fibrous material impregnated with resinoid, the side wall base member being grooved to receive a reinforcing member circumferentially about its outer surface, the reinforcing member being given a preset to have a diameter when unrestrained smaller than the outer diameter of the side wall base member whereby when applied to the side wall base member the reinforcing member engages the side wall base member with a biasing action.

3. In a centrifuge bucket comprising, in combination, a side wall base member of fibrous material impregnated with resinoid, a reinforcing member for the side wall base member comprising a turn of wire about the outer surface thereof, the wire being given a preset whereby the turn has a diameter when unrestrained smaller than the outer diameter of the side wall base member so that when applied to the side wall base member it engages the side wall base member with a biasing action.

4. In a centrifuge bucket comprising, in combination, a side wall base member of fibrous material impregnated with resinoid, a reinforcing member for the side wall base member comprising continuous turns of wire about the outer surface thereof, the wire being given a preset whereby the turns have a diameter when unrestrained smaller than the outer diameter of the side wall base member so that when applied to the side wall base member the wire engages the side wall base member with a biasing action.

5. In a centrifuge bucket comprising, in combination, a side wall base member formed from fibrous material united by an artificial resin, the side wall base member being grooved to receive a continuous reinforcing member circumferentially about its outer surface, the reinforcing member being given a preset to have a diameter when unrestrained smaller than the outer diameter of the side wall base member whereby when applied to the grooves the reinforcing member engages the side wall base member with a biasing action.

6. In a centrifuge bucket comprising, in combination, a side wall base member of predetermined outer diameter formed from fibrous material impregnated with resinoid, the side wall base member being grooved to receive a reinforcing member wound thereabout, the reinforcing member having a preset curve imparted thereto, the preset curve of the reinforcing member having a diameter when the reinforcing member is unrestrained smaller than the predetermined outer diameter of the side wall base member whereby the reinforcing member when applied to the side wall base member engages it with a biasing action.

7. In a centrifuge bucket comprising, in combination, a side wall base member of a predetermined outer diameter formed from fibrous material impregnated with resinoid, a reinforcing member disposed circumferentially about the side wall base member comprising at least one turn of wire thereon, the wire having a preset curve imparted thereto to form the turn, the preset curve having a diameter when the wire is unrestrained smaller than the predetermined outer diameter of the side wall base member whereby the wire when applied to the side wall base member engages it with a biasing action.

8. In a centrifuge bucket comprising, in combination, a side wall base member of fibrous material impregnated with resinoid, the side wall base member being adapted to receive a reinforcing member circumferentially about its outer surface, the reinforcing member being given a preset to have a diameter when unrestrained smaller than the outer diameter of the side wall base member whereby when applied to the side wall base member the reinforcing member engages the side wall base member with a biasing action, and an outer side wall cover member of fibrous material impregnated with resinoid disposed over the reinforcing member, the outer side wall cover member and the side wall base member being consolidated under heat and pressure with the preset reinforcing member intermediate thereof.

9. In a centrifuge bucket comprising, in combination, a side wall base member of fibrous material impregnated with resinoid, a reinforcing member for the side wall base member comprising turns of wire having free ends wound around the outer surface thereof, each of the ends of the wire having a sleeve of fibers thereon, the wire being given a preset curved shape to have a diameter when unrestrained smaller than the outer diameter of the side wall base member whereby when applied to the side wall base member it engages the side wall base member with a biasing action.

10. In a centrifuge bucket comprising, in combination, a side wall base member of fibrous material impregnated with resinoid, a reinforcing member for the side wall base member comprising continuous turns of wire wound about the outer surface thereof, the wire being given a preset whereby the turns have a diameter when unrestrained smaller than the outer diameter of the side wall base member so that when applied to the side wall base member the wire engages the side wall base member with a biasing action, and an outer side wall cover member of fibrous material impregnated with resinoid disposed over the reinforcing member, the outer side wall cover member and the side wall base member being consolidated under heat and pressure with the preset reinforcing member intermediate thereof to maintain a compression force on the side wall base member and strengthen the consolidated unit.

11. In a centrifuge bucket, in combination, an inside bucket component for receiving a charge, and a reinforcing member applied circumferentially around the outer surface of the bucket component, the reinforcing member having a preset imparted thereto, the preset reinforcing member being of smaller diameter when unrestrained than the outside diameter of the bucket component whereby the reinforcing member when disposed on the bucket component applies a biasing force.

12. In a centrifuge bucket, in combination, a side wall base member of fibrous material impregnated with resinoid, a reinforcing member applied circumferentially about the outer surface of the side wall base member, the reinforcing member being given a preset curved shape whereby the curved reinforcing member has a diameter when unrestrained smaller than the outer diameter of the side wall base member so that when applied to the side wall base member the reinforcing member engages the side wall member with a biasing action, and an outer side wall cover member disposed over the reinforcing member, the outer side wall cover member and the side wall base member being consolidated into an integral unit with the preset reinforcing member intermediate thereof.

13. In a centrifuge bucket, in combination, an inside bucket component for receiving a charge, a reinforcing member disposed about the outer surface of the bucket component, the reinforcing member having a preset imparted thereto, the preset reinforcing member being of smaller diameter when unrestrained than the outer diameter of the bucket component whereby the reinforcing member when disposed on the inside bucket component applies a biasing force thereto, and a cover member disposed over the reinforcing member, the cover member and the inside bucket component being consolidated into an integral unit with the preset reinforcing member intermediate thereof.

14. In a centrifuge bucket, in combination, an inside bucket component of fibrous material impregnated with resinoid, a reinforcing member for the inside bucket component comprising continuous turns of wire disposed about the outer surface thereof, the wire being given a preset curved shape whereby the turns have a smaller diameter when unrestrained than the outer diameter of the bucket component so that when applied to the inside bucket component the turns of wire engage the inside bucket component with a biasing action, and a cover member disposed over the turns of wire, the cover member and the inside bucket component being consolidated into an integral unit with the preset wire reinforcing member intermediate thereof.

15. In a centrifuge bucket, in combination, an inside bucket component for receiving a charge, and a reinforcing member of stainless steel wire having a minimum tensile strength of 200,000 pounds per square inch and having a preset applied thereto disposed circumferentially about the outer surface of the bucket component to apply a biasing force thereto, the preset of the reinforcing member being so great that when unrestrained the reinforcing member will assume a diameter smaller than the outside diameter of the bucket component.

16. In a centrifuge bucket, in combination, an inside bucket component for receiving a charge, and a reinforcing member comprising a plurality of turns of wire wound around the outer surface of the bucket component, the turns of wire having a preset applied thereto so great that when wound on the bucket component they apply a biasing force thereto and when unrestrained the turns of wire will assume a diameter smaller than the outside diameter of the bucket component.

17. In a centrifuge bucket, in combination, a side wall base member of fibrous material impregnated with resinoid, and a plurality of turns of wire wound helically around the outer surface of the side wall base member, the turns of wire having a preset applied thereto so great that when wound on the base member they apply a biasing force thereto and when unrestrained the turns of wire will assume a diameter smaller than the outside diameter of the side wall base member.

HOWARD R. MOYER.

REFERENCES CITED

The following references are of record in the file of this patent:

UNITED STATES PATENTS

| Number | Name | Date |
|---|---|---|
| 2,199,197 | Gatke | Apr. 30, 1940 |
| 1,979,953 | Bergman | Nov. 6, 1934 |
| 1,962,935 | Richardson | June 12, 1934 |
| 2,010,711 | Bergman | Aug. 6, 1935 |
| 1,272,241 | Ernst | July 9, 1918 |
| 1,962,936 | Richardson | June 12, 1934 |

FOREIGN PATENTS

| Number | Country | Date |
|---|---|---|
| 365,963 | Great Britain | June 12, 1931 |